Nov. 30, 1943.　　J. F. SLADKY ET AL　　2,335,546
AUTOMOBILE FRAME
Filed Nov. 9, 1940　　2 Sheets-Sheet 2
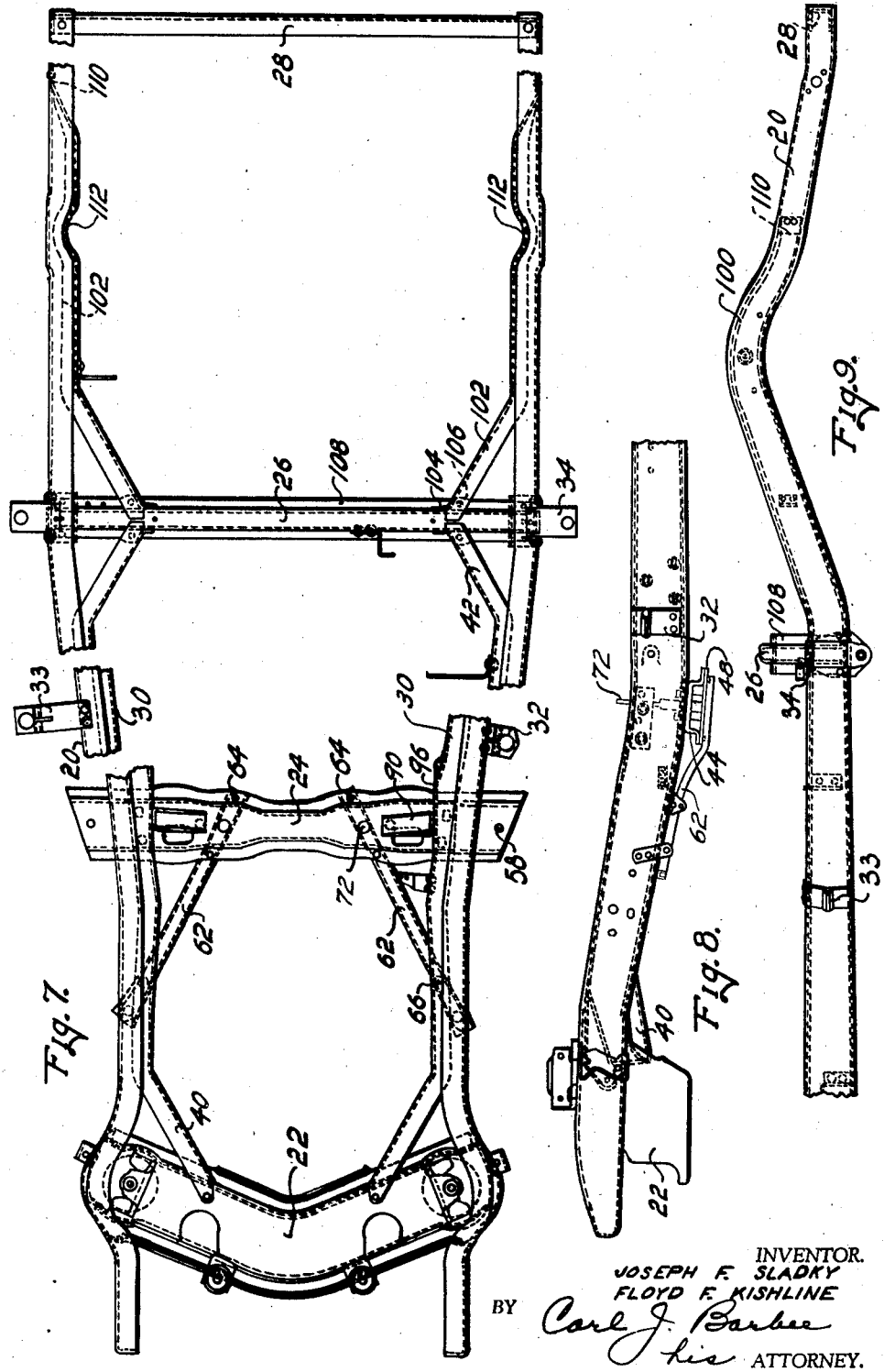
INVENTOR.
JOSEPH F. SLADKY
FLOYD F. KISHLINE
BY Carl J. Barbee
his ATTORNEY.

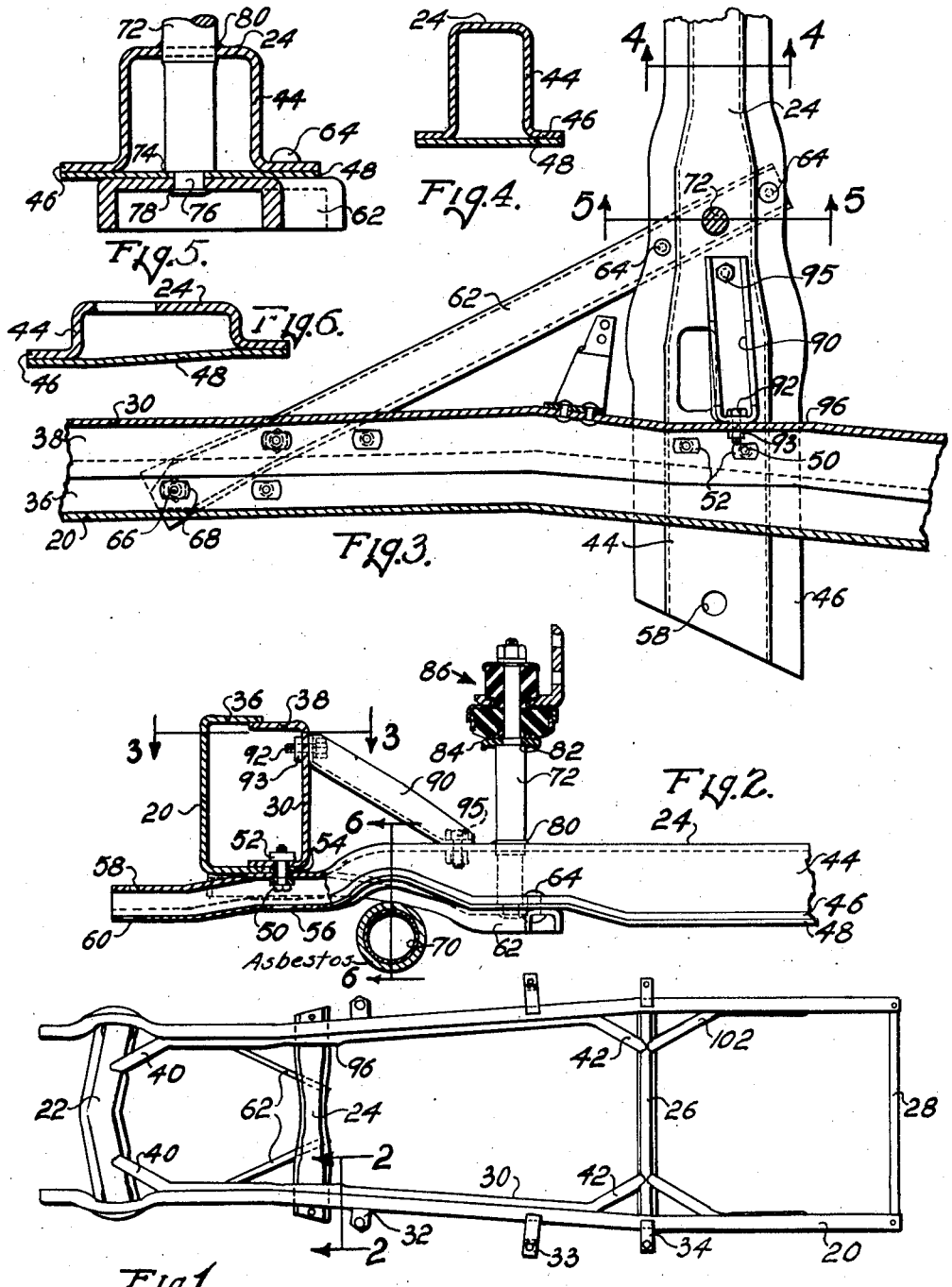

Patented Nov. 30, 1943

2,335,546

UNITED STATES PATENT OFFICE 2,335,546

AUTOMOBILE FRAME

Joseph F. Sladky, Racine, and Floyd F. Kishline, Kenosha, Wis., assignors to Nash-Kelvinator Corporation, Kenosha, Wis., a corporation of Maryland Application November 9, 1940, Serial No. 364,990

13 Claims. (Cl. 280—106)

This invention relates to automobile frames and has particular reference to means for bracing the frame of an automobile so that the frame will support the motor and body of the automobile without excessive distortion.

It is an object of this invention to provide novel means for bracing a rear motor support member with respect to the frame of an automobile.

It is another object of this invention to provide novel means for straightening the rear portion of an automobile frame.

It is another object of this invention to provide bracing means which will prevent the rear motor support member from flexing in a vertical plane.

It is another object of this invention to provide bracing means which will prevent the rear motor support of an automobile from flexing in a horizontal plane.

It is another object of this invention to provide a rear motor support member which operates to support the rear portion of the motor and at the same time support the automobile body upon the frame and act as a bracing member between various parts of the frame and body.

Other objects and advantages of this invention will be apparent from a consideration of the following description and claims and the attached drawings, of which there are two sheets and in which—

Figure 1 represents a plan view of an automobile frame;

Figure 2 represents a sectional view taken along a plane indicated by the line 2—2 in Figure 1;

Figure 3 represents a sectional view taken along a plane indicated by the line 3—3 in Figure 2;

Figure 4 represents a sectional view taken along a plane indicated by the line 4—4 in Figure 3;

Figure 5 represents a sectional view taken along a plane indicated by the line 5—5 in Figure 3;

Figure 6 represents a sectional view taken along a plane indicated by the line 6—6 in Figure 2;

Figure 7 represents an enlarged plan view partially broken away illustrating in detail the construction of the frame illustrated in Figure 1;

Figure 8 represents an enlarged side elevation of the front end of the frame illustrated in Figure 1, and;

Figure 9 represents an enlarged side elevation showing in detail the construction of the back end of the frame illustrated in Figure 1.

The frame consists of side rail members 20 which are connected by a front cross member 22, a rear motor support cross member 24, an intermediate cross member 26 and a rear cross member 28. The side rails 20 are reinforced by filler rails 30 and carry the body mounting brackets 32, 33 and 34 which extend outwardly on each side of the frame.

More specifically, the side rail members 20 are channel shaped in cross section having their flanges 36 turned inwardly towards the center of the frame. The filler rails 30 are also channel shaped in cross section and have their flanges 38 turned outwardly and nested inside of the flanges 36. The flanges 36 and 38 are welded together to form a side member of hollow, box shaped cross section. The front ends of the filler rails 30 are bent inwardly as at 40 and are secured to the front cross member 22 at points spaced inwardly from the ends of the cross member. The rear ends of the filler rails 30 are also bent inwardly as at 42 and are attached to the intermediate cross member 26 at points spaced inwardly from the ends of the cross member.

The rear motor support cross member 24 consists of a downwardly opening channel shaped member 44 having the lower edges of its flanges turned outwardly to form generally horizontal flanges 46. The channel shaped cross section of the cross member 24 is closed and formed into a hollow box section by a bottom plate 48 which is welded or otherwise suitably secured to the horizontal flanges 46. The cross member 24 is secured to the underside of the side rails of the frame by means of bolts 50 which are passed upwardly through the flange 39 of the filler rails 30 and threaded into bosses 52 which are welded onto the inside surface of the flange 38 before the rail 30 is joined with the rail 20. Spacing washers 54 are provided between the upper surface of the cross member 24 and the lower surface of the flange 38 so that the cross member will be flush with the under-surface of the flanges 36 of the side rails 20. The closing plate 48 is apertured as at 56 so that access may be had to the bolt 50 from underneath the cross member. Attention is called to the fact that the ends of the cross member 24 extend beyond the outer sides of the side rails 20 and are provided with apertures 58 through which bolts may be passed for securing the body of the automobile (not shown) to the cross member. The closing plate 48 is also apertured as at 60 so that the bolts just mentioned may be tightened from underneath the cross member.

The cross member 24 is not of constant cross sectional dimensions, being relatively deep and narrow in the middle and widening into a flat shallow section near the ends. Figures 4, 5 and 6 indicate the changes in cross sectional dimensions.

To keep the cross member 24 from flexing in a horizontal plane as the body loads and motor loads tend to shift forwardly and backwardly with respect to the frame, the cross member 24 is connected to the side rail members by a pair of diagonal braces 62. The inner ends of the braces 62 are secured to the underside of the cross member 24 at points spaced inwardly from the side rails and where the cross section of the cross member 24 is generally rectangular (see Figure 5). The connection is made by means of rivets 64 passed through the brace 62 and the side flanges 46 and closing plate 48 of the cross member. The outer ends of the braces 62 are secured to the underside of the side rails by means of bolts 66 which are threaded into bosses 68 welded to the inside of the side rails before the members 20 and 30 are welded together. The braces 62 are channel shaped in cross section having their flanges pointed downwardly and are curved sharply upwardly after leaving the underside of the cross member 24 so as to clear an exhaust pipe 70 which extends backwardly from the motor. The cross member 24 is also provided with a bent up portion where it passes over the exhaust pipe (see Figure 2).

The upper surface of the cross member 24 is pierced just over the braces 62 so as to receive masts 72 which extend vertically downward through the cross member 24 and are provided with a lower shouldered end 74 which rests upon the closing plate 48. The tips of the masts 76 extend through the closing plate 48 and the braces 62 and are riveted over as at 78 to retain the masts in place. It is also desirable to weld the mast to the upper surface of the cross member as is indicated at 80. The masts 72 extend upwardly and are provided with an upper shoulder 82 upon which rest circular plates 84 which form supports for a flexible motor mount generally indicated at 86.

In order to keep the cross member 24 from flexing in a vertical plane under the load of the motor applied to the masts 72, the cross member 24 is braced with respect to the side rails 20 by means of vertical braces 90 which are secured between the upper edge of the filler rails 30 and the upper surface of the cross member 24. The braces 90 are generally channel shaped in cross section, having their flanges turned upwardly. The webbed portion of the braces 90 is bent at each end so as to fit against the surfaces of the cross member and filler rail. The braces 90 are secured in place by means of bolts 92 passed through the upper ends of the braces and threaded into the bosses 93 secured to the inside of the filler rail 30. The braces 90 are fastened to the upper side of the cross member 24 by bolts 95 and passed through the braces and the web of the channel member 44. The closing plate 48 is cut away under the bolts 95 so that they may be reached from below the cross member.

Attention is called to the fact that the side rails 20 and the filler rails 30 taper together toward the front of the car and that the filler rails 30 are substantially parallel to the side rails 20 except at the cross member 24 where the filler rails 30 are bent into parallel relationship as at 96 so that the braces 90 may be attached to surfaces which are parallel to the longitudinal axis of the frame.

Just to the rear of the intermediate cross member 26, the side rail members 20 are provided with an upwardly bent portion 100 known as a kick-up which is used to clear the rear axle of the automobile (not shown). The side rail members are strengthened along the kick-up by filler channels 102 which have their flanges facing outwardly and which are nested within the side rail members 20. At the forward end of the channels 102 the braces are bent inwardly and are secured to the intermediate cross member 26 by bending back the webbed portion of the channel as at 104 to form a tab which is welded to the side of the cross member 26. The upper flange of the filler channels extend over and are welded to the top surface of the cross member 26. The lower flange of the filler channels 102 may be riveted as at 106 to a horizontal flange 108 turned outwardly from the lower edge of the cross member 26.

The rear ends of the filler channels 102 are bent outwardly and have the flanges thereof cut in a tapered fashion leaving tabs 110 on the end of the webbed portion of the filler channels which are riveted or otherwise suitably secured to the webbed portion of the side rails 20. The side rails 20 are thus formed into hollow box sections over the kick-up 100 and are braced against bending relative to the cross member 26 by the filler channels 102. Attention is called to the fact that both the side rails 20 and the filler channels 102 are provided with a sharp outward bend at 112 (see Figure 7) in order to clear coil springs or shocks absorbers (not shown) which may be used to mount the frame and body on the rear axle of the automobile.

While we have described our invention in some detail, we intend this description to be an example only and not as a limitation of our invention to which we make the following claims:

1. In combination with an automobile frame having side rail members of hollow cross section, a cross member of hollow cross section secured to the underside of said side rail members and extending beyond the outer surfaces thereof, and diagonal braces extending from the under surface of said side rail members to the under surface of said cross member.

2. In combination with an automobile frame having side rail members of hollow cross section, a cross member of hollow cross section secured to the underside of said side rail members and extending beyond the outer surfaces thereof, and diagonal braces extending from the under surface of said side rail members to the under surface of said cross member at points spaced inwardly from said side rail members.

3. In combination with an automobile frame having side rail members of hollow cross section, a cross member of hollow cross section secured to the underside of said side rail members and extending beyond the outer surfaces thereof, diagonal braces extending from points forwardly of said cross member on said side rail members to points on said cross member between said side rail members, motor supporting masts secured to said diagonal braces, and other diagonal braces extending from the inside surfaces of said side rail members to the upper surface of said cross member at points spaced inwardly from said side rail members.

4. In combination with an automobile frame having side rail members of hollow cross section, a cross member of hollow cross section secured to the underside of said side rail members and extending beyond the outer surfaces thereof, diagonal braces extending from points forwardly of said cross member on said side rail members to points on said cross member between said side rail members, motor supporting masts secured to said diagonal braces, and other diagonal braces extending from the inside surfaces of said side rail members to the upper surface of said cross member at points spaced inwardly from said side rail members, said other diagonal braces lying generally in a vertical plane passed through said cross member.

5. In combination with an automobile frame having side rail members, a cross member arranged to support a motor between said side rail members and extending beyond the outer sides of said side rail members to form supports for a body at points spaced outwardly from said side rail members, and brace means extending to said cross member from points on said side rail members, longitudinally displaced from said cross member for stiffening said cross member against deflection in a horizontal direction.

6. In combination with an automobile frame having side rail members, a cross member arranged to support a motor between said side rail members and extending beyond the outer sides of said side rail members to form supports for a body at points spaced outwardly from said side rail members, and brace means extending to said cross member from points on said side rail members vertically displaced from said cross member for stiffening said cross member against deflection relative to said side rail members in a vertical direction.

7. In combination with an automobile frame having side rail members, a cross member secured to the underside of said side rail members and extending beyond the outer surfaces thereof, diagonal braces extending from points forwardly of said cross member on said side rail members to points on said cross member between said side rail members, motor supporting masts secured to said diagonal braces, and other diagonal braces extending from the inside surfaces of said side rail members to the upper surface of said cross member at points spaced inwardly from said side rail members, said other diagonal braces lying generally in a vertical plane passed through said cross member.

8. In combination with an automobile frame having side rail members of hollow cross section, a cross member of hollow cross section secured to the underside of said side rail members and extending beyond the outer surfaces thereof, diagonal braces extending from points forwardly of said cross member on said side rail members to points on said cross member between said side rail members, motor supporting masts secured to said diagonal braces and said cross member, and other diagonal braces extending from the inside surfaces of said side rail members to the upper surface of said cross member at points spaced inwardly from said side rail members.

9. In combination with an automobile frame having side rail members of hollow cross section, a cross member of hollow cross section secured to the underside of said side rail members and extending beyond the outer surfaces thereof, diagonal braces extending from points forwardly of said cross member on said side rail members to points on said cross member between said side rail members, motor supporting masts secured to said diagonal braces and said cross member, and other diagonal braces extending from the inside surfaces of said side rail members to the upper surface of said cross member at points spaced inwardly from said side rail members, said other diagonal braces lying generally in a vertical plane passed through said cross member.

10. In combination with an automobile frame having side rail members, a cross member secured to the underside of said side rail members and extending beyond the outer surfaces thereof, diagonal braces extending from points forwardly of said cross member on said side rail members to points on said cross member between said side rail members, motor supporting masts secured to said diagonal braces and said cross member, and other diagonal braces extending from the inside surfaces of said side rail members to the upper surface of said cross member at points spaced inwardly from said side rail members, said other diagonal braces lying generally in a vertical plane passed through said cross member.

11. In combination with an automobile frame having side rails, a cross member of hollow cross section secured to the underside of said side rails and extending therebeyond, the cross section of said cross member changing from a high narrow section at the middle to a generally square section at points spaced inwardly from said side rails to a flat broad section under said side rails and outside thereof.

12. In combination with an automobile frame having side rails, a cross member of hollow cross section secured to the underside of said side rails and extending therebeyond, the cross section of said cross member changing from a high narrow section at the middle to a generally square section at points spaced inwardly from said side rails to a flat broad section under said side rails and outside thereof, and motor support masts extending vertically through said generally square section and secured thereto.

13. In an automobile frame, a pair of spaced channel side rails having their flanges inwardly presented, a plurality of cross members, one of said cross members being located adjacent the front of the frame and another being located adjacent the rear of the frame, frame sub-members of channel cross section nested within said side rails and having their channels outwardly presented to form box-sections with the respective side rails, said sub-members each being generally straight in the intermediate portion and having each end portion bent inwardly at an obtuse angle to said intermediate portion and said end portions each being secured to a cross member, and additional channel shaped sub-members each nested within one side rail and having one end secured to said side rail and the other end bent inwardly and secured to one cross member in alignment with the connection of one of said first-mentioned sub-members with said cross member.

JOSEPH F. SLADKY.
FLOYD F. KISHLINE.

CERTIFICATE OF CORRECTION.

Patent No. 2,335,546.  November 30, 1943.

JOSEPH F. SLADKY, ET AL.

It is hereby certified that error appears in the printed specification of the above numbered patent requiring correction as follows: Page 1, first column, line 11, for the word "straightening" read --strengthening--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.